United States Patent Office 3,476,653
Patented Nov. 4, 1969

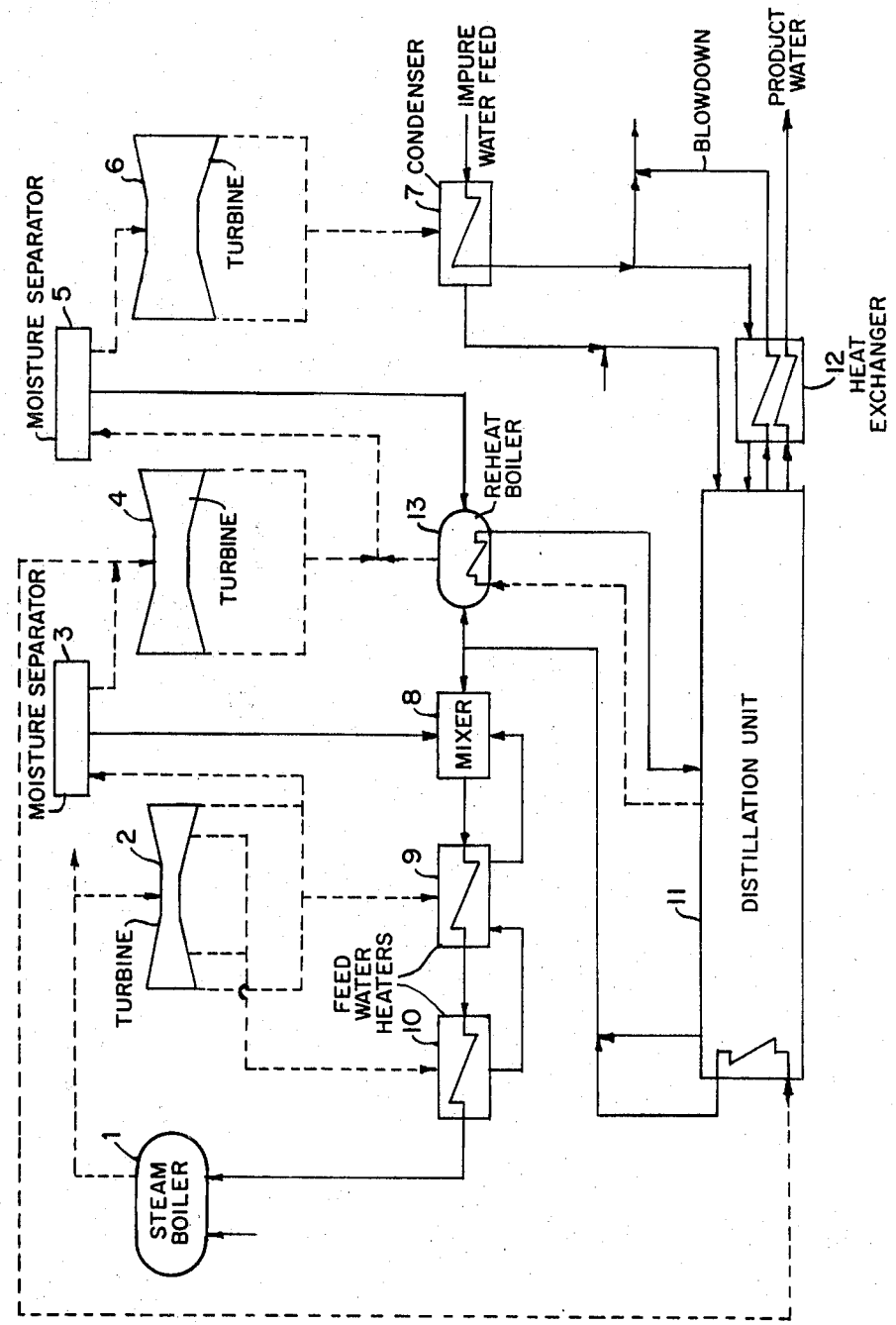

3,476,653
MULTISTAGE DISTILLATION UNIT FOR WATER AND POWER PLANT SYSTEM
George D. Doland, 1602 Redway, Houston, Tex. 77058
Filed Feb. 1, 1967, Ser. No. 613,142
Int. Cl. C02b 1/06; F01k 17/02; B01d 3/00
U.S. Cl. 202—173
3 Claims

ABSTRACT OF THE DISCLOSURE

The invention herein relates to a water and power plant system capable of purifying sea water or other impure water while generating electrical power. The improvements which are the essential features of the invention are first, the system does not use so called "waste heat" from the power plant to operate the water plant. Thermal energy is transferred from the power plant to the water plant by condensing power plant steam from an intermediate portion of the power plant steam cycle. Energy is returned to the power plant by a reheat boiler which condenses product vapor while producing steam from the power plant feedwater. The second improvement results from heating power plant feedwater while the product vapor in the water plant is condensed. The third improvement results from substitution of unprocessed impure water for partially processed sea water to obtain a lower boiling point elevation.

---

The current process for water purification and electrical power generation consists of a cascaded power plant and water plant. This is not optimum since the theoretical efficiency is dependent upon the temperature of the source and sink. This patent relates to improvements in the process concerned with recovery of energy from the water plant for use in the power plant.

In order to have the lowest possible exhaust temperature for the lowest temperature section of the turbine used for power generation, the water plant must be operated in parallel with the power plant. To insure the maximum conversion from thermal energy to mechanical and then electrical power, the brine or impure water is heated using steam extracted from the turbine at an extraction point or between sections. Energy is returned from the water plant for feedwater heating and revaporizing condensed steam. Thermal energy not recovered and which must be extracted to condense product vapor to product water can be removed by a product water condenser using an external supply of cooling water similar to the condenser of a power-only plant.

When minerals such as salt are dissolved in water, the boiling point temperature is higher than pure water at the same pressure.

This is commonly referred to as the boiling point elevation. The higher the concentration of impurities, the greater the boiling point elevation. Therefore, when purifying water by distillation; the evaporator where the vapor is produced must be at a temperature higher, by the boiling point elevation, than the condenser where the product vapor is condensed to product water. The temperatures must also be arranged so that the thermal energy to be transferred from the product vapor and product water is a cooler material.

In a multistage flash distillation unit, the latent heat of vaporization is absorbed by impure water heating it as the product water condenses. In other distillation units, the heat may be transferred to impure water being vaporized. In this invention, thermal energy is used for three distinctly different purposes; (a) heating brine or impure water prior to purification by distillation, (b) vaporizing impure water, and (c) heating feedwater for the power plant. The distillation unit consists of a series of cascaded stages. Impure water enters the first or highest temperature stage a few degrees below the temperature distillation to be started. In this stage, the temperature is increased to the boiling point and a portion of the impure water is made to vaporize. The next or second stage consists of a condenser and vaporizer. The product vapor from the first stage enters the condenser of the second stage and both operate at the same pressure. The second stage condenser is operated at a temperature lower than the first stage evaporator by an amount equal to or greater than the boiling point elevation so the product vapor condenses. The condenser is constructed in the form of a heat exchanger so that as the product water condenses; part of the heat is transferred to brine being heated, a second part is transferred to power plant feedwater being heated, and a third part is transferred to the evaporator.

The evaporator of the second stage operates at a lower pressure and a lower temperature than the evaporator of the first stage and receives impure water from the first stage. Because of the low pressure a portion of the hot impure water from the first stage flashes to vapor as it enters the second stage evaporator and the temperature drops to the boiling point temperature for the pressure and concentration of impurities. This stable boiling point temperature is lower than the temperature of the condenser for the same stage. Heat is conducted or transferred from the condenser to the evaporator as described in the preceding paragraph. Since the impure water of this stage is at the boiling point, any heat conducted to the evaporator causes impure water to vaporize.

Each of the following stages may be similar to this second stage except for the last stage. This last stage may consist of a condenser without an evaporator; or vapor produced in the last stage discharged from the system without condensing it. Of course, this discharged vapor would be a loss of pure water and could be exhausted to the atmosphere only if the pressure were higher than atmospheric pressure.

The amount of impure water vaporized in any stage depends upon the temperature differential between stages which is dependent upon the operating pressures, and also by the amount of heat conducted in the stage from the condenser to the evaporator. If thermal energy is used to heat feedwater, there is less available to vaporize impure water. However, thermal energy can be used to produce vapor in the first stage; the energy is recovered in the second stage from the vapor as it is condensed, and the energy used to produce additional vapor in the second stage evaporator, the recovery of the thermal energy producing additional vapor can be utilized in several stages, and then the energy used for feedwater heating. Product vapor which is condensed to product water is produced with no loss of energy from the system.

Heating of feedwater can be accomplished in any stage, group of stages, or all stages. Feedwater heating is usually limited to a few degrees per stage. However, the last stage may be a terminal condenser with no evaporator. For this stage, the feedwater may be heated a few degrees or even more than 60 degrees. When many stages are cascaded, and then the feedwater heated, the total product water produced by the recovered energy is equal to the sum of that produced by each stage by the quantity of energy equal to the recovered energy. The product water produced by each stage is equal to the thermal energy divided by the latent heat of vaporization of the vapor for the stage.

Since thermal energy can be extracted for feedwater heating, energy can also be extracted to convert feedwater to steam for the power plant. Instead of condensing the product vapor to product water and vaporizing more impure water, the feedwater may be vaporized. It is required to have steam produced which is suitable to drive a turbine. This is not difficult to achieve as modern turbines exhaust steam at a temperature of about 90 degrees F. and at pressures of 1 to 2 inches of water. Energy can be used to vaporize moisture when moisture separation turbine operation is used.

Energy is usually supplied to the water plant by condensing steam. The temperature of the water returned to the power plant may be 275 to 350 degrees F. The pressure is sufficiently high to keep the water in a liquid state but if the pressure is reduced, some of the water may be converted to the vapor state or steam. The steam produced will be suitable for operation of a low pressure turbine.

The figure is a diagram of a water and power plant incorporating the improvements to the process. The boiler 1 generates steam and may be heated using fossil fuels or nuclear power. The steam from the boiler drives a high pressure turbine 2. One extraction is taken for feedwater heating although the principles of operation are unchanged if several extractions were taken or the one omitted. Exhaust steam from the high pressure turbine or the high pressure section of a combined turbine is fed to the high temperature moisture separator 3.

The high quality steam drives an intermediate pressure turbine or turbine section 4. The exhaust from this unit passes through the low temperature moisture separator 5. The high quality steam produced drives the low pressure turbine or turbine section 6. The exhaust steam is condensed in the power plant condenser 7.

This system can be operated as a power-only system. For power-only operation, a pipe (not shown) would carry the feed water produced in the power plant condenser to the mixing tank 8. The mixing tank mixes feedwater from several sources. For power-only operation the feedwater sources are the power plant condenser, both moisture separators and feedwater heaters. The first feedwater heater 9 uses exhaust steam from the high pressure turbine. The second feedwater heater 10 uses extraction steam from the high pressure turbine.

For power and water production operation, steam is taken from the high temperature moisture separator output and fed to the distillation unit 11 and provide a source of thermal energy. The water condensed from the steam is fed back to the power plant as feedwater. Alternate sources for the steam for the water plant is steam from an extraction point or the exhaust from the high pressure turbine or turbine section.

Brine or impure water to be purified is first used in the power plant condenser as cooling water. It is heated as it condenses the exhaust steam to feedwater. The impure water is next heated in a heat exchanger 12 using the thermal energy of the product water and the concentrated impure water discharged from the distillation unit. The impure water is then heated as it flows through heat exchangers in the terminal condenser and the condensers of each distillation stage. Upon reaching the first stage, the impure water enters the evaporator section of the first stage. A portion is vaporized and the remaining impure water is fed to the second stage. The portion of impure water remaining, after part has been vaporized flows to the next evaporator until the last evaporator has been reached. The impure water from the last evaporator is discharged from the distillation unit as concentrated impure water.

Product water is condensed from the product vapor in each condenser. Heat is extracted from the product water by having the product water flow through heat exchangers located in the evaporator section of each stage. The product water is all discharged from the last stage of the distillation unit at about the same temperature as the concentrated impure water.

Feedwater from the power plant condenser is first heated in the terminal condenser of the distillation unit. It is then heated a little more using heat exchangers in the condenser portion of each stage of the distillation unit through which it passes. The heated feedwater is returned to the power plant.

For one stage (or more if desired), a portion of the product vapor is diverted to the power plant where it is made to condense while vaporizing feedwater. The product water produced is returned to the water plant. This arrangement is used to avoid mixing the product water with the power plant feedwater. This transfer of energy take place in the reheat boiler 13. Both water from a moisture separator and feedwater is vaporized in the system shown in the figure.

In the distillation unit, the temperature difference between the condenser and evaporator is chosen so that there is the required flow of energy from the condenser to the evaporator. The temperature of the evaporator (in the preceding stage) which supplies product vapor to a condenser is operated at a higher temperature than the condenser. The difference in temperature is made equal or slightly greater then the boiling point elevation. This arrangement permits the maximum number of stages for a specified temperature range. The temperature difference between stages will be small for the high temperature stages and large for the low temperature stages because of the high concentration of impurities at the low temperature stages.

It is possible to reduce the stage to stage temperature difference and have more stages by terminating processing of impure water when the boiling point elevation is larger than desired. This is accomplished by feeding the evaporator of one stage with impure water that has been heated in the lower temperature stage condenser heat exchangers instead of impure brine from the higher temperature evaporator. This reduces the amount of impure water heated in the higher temperature stages. The impure brine from the preceding higher temperature evaporator is fed through heat exchangers in each of the lower temperature evaporators so heat is not lost. The impure water which is no longer processed and from which heat is extracted can be combined again with the impure water being processed when the concentrations are about equal avoiding the last few low temperature stages.

The improvements claimed are:

1. A water and power plant system consisting of a means for producing steam, at least one turbine prime mover for an electrical power generator, a means for heating power plant feedwater, a power plant exhaust steam condenser, a multistage distillation unit, and other equipment normally associated with water and power plant facilities; the equipment configured so that the power plant feedwater and steam do not mix with water plant feed, product vapor or product water; steam from an interior portion of the steam expansion cycle being used to provide energy to the water plant as thermal energy is released as the steam condenses to power plant feedwater, energy being recovered from the water plant as power plant feedwater is vaporized to steam by condensing product vapor; the steam produced by recovering thermal energy from the water plant being used as a source of steam for a low pressure turbine section.

2. A water and power plant system as in claim 1 wherein energy is also recovered from the water plant as power plant feedwater is heated using thermal energy released by condensing product vapor to product water.

3. A water and power plant system as in claim 1 wherein unprocessed impure water is substituted for processed impure water for at least one stage to reduce the boiling point elevation.

References Cited

UNITED STATES PATENTS

| | | | |
|---|---|---|---|
| 2,372,846 | 4/1945 | Nettel et al. | 203—11 X |
| 2,759,882 | 8/1956 | Worthen et al. | 203—11 |
| 3,021,265 | 2/1962 | Sadtler et al. | 202—177 |
| 3,140,986 | 7/1964 | Hubbard | 203—11 |
| 3,352,107 | 11/1967 | Blaskowski | 60—64 |
| 3,364,125 | 1/1968 | Switzer | 207—160 |
| 3,391,062 | 7/1968 | Tidball | 203—11 X |

OTHER REFERENCES

Salt Water Conversion Plants (1966), pp. 22–23, U.S. Dept. of Interior, Office of Saline Water.

Symposium-Salt Water Conversion (1958) pp. 105–107, U.S. Dept. of Interior.

Scientific American (March 1957), pp. 4–7 (reprint).

NORMAN YUDKOFF, Primary Examiner

F. E. DRUMMOND, Assistant Examiner

U.S. Cl. X.R.

60—64; 203—11